United States Patent
Lee et al.

(10) Patent No.: US 11,499,465 B2
(45) Date of Patent: Nov. 15, 2022

(54) EXHAUST GAS PURIFICATION SYSTEM FOR VEHICLE

(71) Applicants: Hyundai Motor Company, Seoul (KR); KIA Motors Corporation, Seoul (KR)

(72) Inventors: Hyokyung Lee, Anyang-si (KR); Chang Hwan Kim, Seongnam-si (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 0 days.

(21) Appl. No.: 17/196,316

(22) Filed: Mar. 9, 2021

(65) Prior Publication Data

US 2021/0189940 A1 Jun. 24, 2021

Related U.S. Application Data

(63) Continuation-in-part of application No. 16/539,190, filed on Aug. 13, 2019, now abandoned.

(30) Foreign Application Priority Data

Oct. 19, 2018 (KR) .......................... 10-2018-0125151

(51) Int. Cl.
*F01N 9/00* (2006.01)
*F01N 3/10* (2006.01)
(Continued)

(52) U.S. Cl.
CPC ............... *F01N 9/00* (2013.01); *F01N 3/101* (2013.01); *F01N 3/2803* (2013.01);
(Continued)

(58) Field of Classification Search
CPC .......... F01N 9/00; F01N 3/101; F01N 3/2803; F01N 13/0097; F01N 2430/06;
(Continued)

(56) References Cited

U.S. PATENT DOCUMENTS

2012/0240561 A1* 9/2012 Sobue ................... F01N 3/0814
60/297
2015/0231566 A1* 8/2015 Xu ........................... B01J 23/63
422/171
(Continued)

FOREIGN PATENT DOCUMENTS

| JP | 2004092535 A | 3/2004 |
|---|---|---|
| KR | 10-1180804 B1 | 9/2012 |
| KR | 10-1704270 B1 | 2/2017 |

*Primary Examiner* — Brandon D Lee
(74) *Attorney, Agent, or Firm* — Lempia Summerfield Katz LLC

(57) ABSTRACT

A vehicle exhaust gas purification system and a control method thereof that may effectively remove nitrogen oxides in an exhaust gas even in a cold state, which is the initial stage of an engine starting, is disclosed. A control method of an exhaust gas purification system of a vehicle may include: a step of performing a rich control for controlling a concentration of non-combusted fuel contained in the exhaust gas flowing into the housing to be a rich fuel directly after the starting of the engine; a step of performing a lean control for controlling the concentration of the non-combusted fuel contained in the exhaust gas flowing into the housing to be a lean fuel; a step of determining whether a temperature of the exhaust gas flowing into the housing is a predetermined temperature or more; and a step of performing a normal control for controlling the concentration of the non-combusted fuel contained in the exhaust gas flowing into the housing so that a lean fuel and a rich fuel are periodically repeated with a regular interval.

12 Claims, 6 Drawing Sheets

(51) Int. Cl.
  *F01N 3/28*  (2006.01)
  *F02D 41/06*  (2006.01)
  *F02D 41/14*  (2006.01)
  *F02D 41/02*  (2006.01)
  *F01N 13/00*  (2010.01)

(52) U.S. Cl.
  CPC ....... *F01N 13/0097* (2014.06); *F02D 41/027* (2013.01); *F02D 41/064* (2013.01); *F02D 41/1475* (2013.01); *F01N 2430/06* (2013.01); *F01N 2900/1602* (2013.01)

(58) Field of Classification Search
  CPC ......... F01N 2900/1602; F01N 13/0093; F01N 2900/1402; F02D 41/027; F02D 41/064; F02D 41/1475; F02D 41/062; F02D 41/1446; Y02A 50/20; Y02T 10/12; Y02T 10/40
  See application file for complete search history.

(56) References Cited

U.S. PATENT DOCUMENTS

2018/0023437 A1* 1/2018 Suzuki ................. F02D 41/025
                                                                                    60/274
2019/0178181 A1* 6/2019 Lupescu ................... F01N 3/18

* cited by examiner (a)

(b)

(c)

EXHAUST GAS PURIFICATION SYSTEM FOR VEHICLE

CROSS-REFERENCE TO RELATED APPLICATION

This application is a continuation-in-part patent application to U.S. patent application Ser. No. 16/539,190, filed on Aug. 13, 2019, which claims priority to and the benefit of Korean Patent Application No. 10-2018-0125151, filed on Oct. 19, 2018, which is incorporated herein by reference in its entirety.

FIELD

The present disclosure relates to an exhaust gas purification system of a vehicle and a control method thereof. More particularly, the present disclosure relates to an exhaust gas purification system of a vehicle that is capable of reducing pollutants in the exhaust gas, and a control method thereof.

BACKGROUND

The statements in this section merely provide background information related to the present disclosure and may not constitute prior art.

In general, to reduce carbon monoxide (CO), hydrocarbons (HC), particulate matter (PM), nitrogen oxides (NOx), etc. as pollution materials contained in an exhaust gas, an exhaust system of an engine includes an exhaust gas post-treatment device.

As the exhaust gas post-treatment device of a diesel engine, a diesel oxidation catalyst (DOC) oxidizing all hydrocarbons and carbon monoxide in the exhaust gas and oxidizing nitrogen monoxide to nitrogen dioxide, a diesel particulate matter filter (DPF) trapping particulate matter in the exhaust gas and purifying the particulate matter through a chemical conversion process, a selective catalyst reduction (SCR) system converting a reducing agent (urea), which is injected in a stream direction of the exhaust gas by an injector, to ammonia (NH3) by heat of the exhaust gas, and reducing nitrogen oxides to nitrogen gas (N2) and water (H2O) by a catalyst reaction between nitrogen oxides in the exhaust gas and ammonia by an SCR catalyst, and a lean NOx trap (LNT) absorbing the nitrogen oxides in the exhaust gas and that functions to react the absorbed nitrogen oxides with a reducing agent in a predetermined condition such that the absorbed nitrogen oxides are removed, etc. are applied, however the application of these devices to a gasoline engine entails a considerable cost increase and inconvenience in maintenance and repair of a vehicle such as changing of the elements. In addition, nitrogen oxide (NOx) purification performance may be deteriorated due to a shortage of ammonia NH3 in a high load region of the gasoline engine. Particularly, in the high load region of a lean burn gasoline engine, nitrogen oxide (NOx) purification performance may be excessively deteriorated.

Recently, as a technology performing the exhaust gas post-treatment of the gasoline engine in accordance with environmentally-friendly regulations of vehicles, a three-way catalyst (TWC) simultaneously removing carbon monoxide, nitrogen oxide, and hydrocarbons based on at least one (mainly palladium alone or a combination of at least one of platinum and rhodium, and palladium) of catalysts of palladium (Pd), platinum (Pt), and rhodium (Rh) series has been developed to be applied to the exhaust gas post-treatment device of the gasoline engine.

However, in the exhaust gas post-treatment using the three-way catalyst, control for alternately forming a lean fuel and a rich fuel condition of the engine to oxidize carbon monoxide and hydrocarbons and to simultaneously reduce nitrogen oxides may be employed, and in the state that the engine is heated and the three-way catalyst is warmed up, the harmful components of the exhaust gas as well as nitrogen oxides are removed to near 100%, but there is a limit to removing nitrogen oxides in a cold state at the initial stage of an engine startup. According to an experiment result, in a case of evaluating the exhaust gas post-treatment device using the conventional three-way catalyst in which the lean fuel and rich fuel conditions of the engine are periodically shifted in accordance with a criteria of a US Environmental Protection Agency-specified urban driving mode FTP-75, in the cold state at the initial state of the engine startup, it has been shown that over 60% of the total exhausted nitrogen oxides contained in the exhaust gas is not removed but is exhausted through the tail pipe. Particularly, since a high efficiency engine that is being applied to the vehicle to satisfy a fuel consumption regulation, which is one of the environmentally friendly regulations of the vehicle, is being developed to lower the exhaust gas temperature, a technology for purifying the exhaust gas of a low temperature is further desired.

The above information disclosed in this Background section is only for enhancement of understanding of the background of the present disclosure, and therefore it may contain information that does not form the prior art that is already known to a person of ordinary skill in the art.

SUMMARY

The present disclosure provides an exhaust gas purification system of a vehicle and a control method capable of effectively removing nitrogen oxides in an exhaust gas even in a cold state of an initial stage of an engine startup.

An exhaust gas purification system of a vehicle according to one form of the present disclosure may be an exhaust gas purification system for a vehicle provided on an exhaust pipe connected to an exhaust side of the engine for purifying an exhaust gas of an engine system.

The exhaust gas purification system of the vehicle according to one form of the present disclosure may include: a housing receiving the exhaust gas exhausted from the engine and disposed on the exhaust pipe to exhaust the passing exhaust gas backward; a front catalyst embedded in the housing to primarily purify the exhaust gas flowing into the housing through the front of the housing; a rear catalyst embedded in the housing to secondarily purify the exhaust gas passing through the front catalyst before flowing out to the rear of the housing; and a controller connected to the exhaust pipe at the front of the housing and controlling a concentration of a non-combusted fuel included in the exhaust gas according to a temperature of the exhaust gas flowing into the housing.

The controller may temporarily perform a rich control for controlling the concentration of the non-combusted fuel included in the exhaust gas flowing into the housing to be rich fuel when the temperature of the exhaust gas flowing into the housing is less than a predetermined temperature.

The controller may continuously perform a lean control for controlling the concentration of the non-combusted fuel included in the exhaust gas flowing into the housing to be lean fuel after the rich control when the temperature of the exhaust gas flowing into the housing is less than a predetermined temperature.

The front catalyst is a palladium catalyst oxidizing hydrocarbons and carbon monoxide and simultaneously occluding nitrogen oxides.

The front catalyst may be a Pd/CZO catalyst.

The rear catalyst may be a rhodium catalyst reducing nitrogen oxides.

The rear catalyst may be a Rh/CZO catalyst.

The controller may perform a normal control for controlling the concentration of the non-combusted fuel contained in the exhaust gas flowing into the housing so that a lean fuel and a rich fuel are periodically repeated with a regular interval when the temperature of the exhaust gas flowing into the housing is a predetermined temperature or more.

The rich control may last for more than 1 second at a lambda value of less than 0.9.

The lean control may have a lambda value of more than 1.03.

A control method of an exhaust gas purification system of a vehicle according to one form of the present disclosure may be one in which a front catalyst to primarily purify the exhaust gas and a rear catalyst to secondarily purify the exhaust gas passing through the front catalyst are embedded in a housing receiving an exhaust gas exhausted from an engine and disposed on an exhaust pipe to exhaust a passing exhaust gas backward, and a concentration of a non-combusted fuel contained in the exhaust gas is controlled according to a temperature of the exhaust gas flowing into the housing by a controller.

The control method of the exhaust gas purification system of the vehicle according to one form of the present disclosure may include: a step of performing a rich control for controlling the concentration of the non-combusted fuel contained in the exhaust gas flowing into the housing to be a rich fuel directly after the starting of the engine; a step of performing a lean control for controlling the concentration of the non-combusted fuel contained in the exhaust gas flowing into the housing to be a lean fuel; a step of determining whether a temperature of the exhaust gas flowing into the housing is a predetermined temperature or more; and a step of performing a normal control for controlling the concentration of the non-combusted fuel contained in the exhaust gas flowing into the housing so that a lean fuel and a rich fuel are periodically repeated with a regular interval.

The rich control may be temporarily performed and the lean control is performed after the front catalyst is reduced by the temporary rich control.

Whether the temperature of the exhaust gas flowing into the housing is the predetermined temperature or more may be continuously determined while the lean control is performed.

If the temperature of the exhaust gas flowing into the housing is less than the predetermined temperature, the lean control may be continuously performed.

If the temperature of the exhaust gas flowing into the housing is the predetermined temperature or more, the normal control is performed.

The control method may be finished when performing the normal control.

The front catalyst may be a palladium catalyst oxidizing hydrocarbons and carbon monoxide and simultaneously occluding nitrogen oxides, and the rear catalyst may be a rhodium catalyst reducing nitrogen oxides.

The nitrogen oxides may be occluded to the front catalyst while the lean control is performed in the state that the temperature of the exhaust gas flowing into the housing is less than the predetermined temperature after the rich control is performed, and nitrogen oxides may be separated from the front catalyst and reduced in the rear catalyst while the temperature of the exhaust gas flowing into the housing is the predetermined temperature or more such that the normal control is performed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
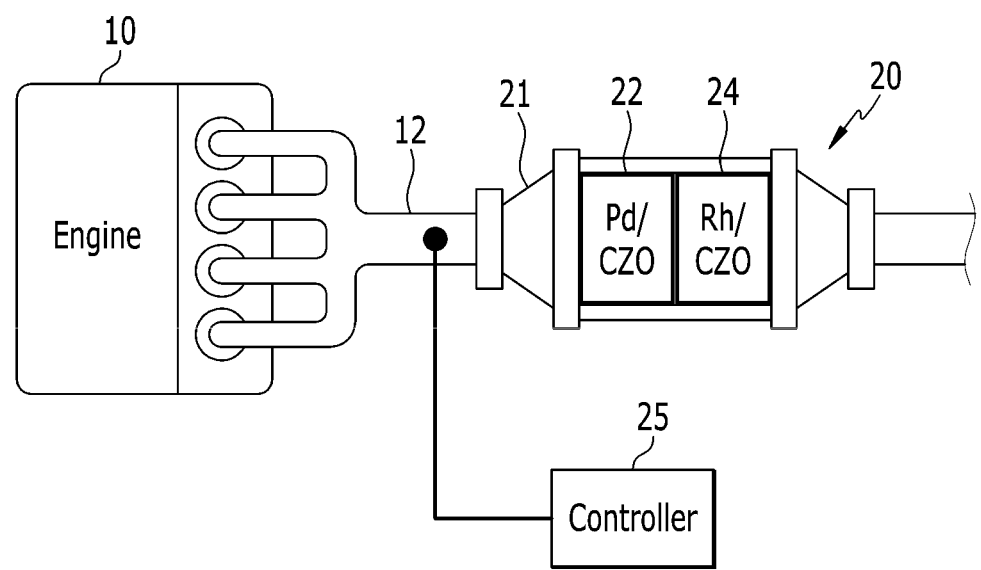
FIG. 1 is a schematic diagram of an exhaust gas purification system of a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Aspects of the present disclosure will hereinafter be described in detail with reference to the accompanying drawings.

FIG. 1 is a schematic diagram of an exhaust gas purification system of a vehicle according to one form of the present disclosure.

As shown in FIG. 1, an exhaust gas purification system 20 of a vehicle may be provided on an exhaust pipe 12 for purifying an exhaust gas of an engine 10. The engine 10 is equipped with at least one combustion chamber 31, and an injector 32 is mounted in each combustion chamber 31 to inject a fuel thereinto. The combustion chamber 31 is fluidly connected to an intake pipe 33 such that an air is supplied into the combustion chamber 31 through the intake pipe 33. An air flowmeter 34 is mounted at the intake pipe 33 to detect a flow rate of the air flowing through the intake pipe 33. In addition, the combustion chamber 31 is fluidly connected to the exhaust pipe 12 such that the exhaust gas is discharged out of the combustion chamber 31 through the exhaust pipe 12. A temperature sensor 35 is mounted at the exhaust pipe 12 to detect a temperature of the exhaust gas flowing through the exhaust pipe 12.

The exhaust gas purification system 20 includes a front catalyst 22 and a rear catalyst 24 in a housing 21. FIG. 1 shows a part of the housing 21 that is cut to show a configuration of the front catalyst 22 and the rear catalyst 24.

The exhaust pipe 12 is connected with the exhaust side of the engine 10 to exhaust the exhaust gas exhausted from the engine 10 to the outside. Meanwhile, the exhaust pipe 12 may extend rearward along an under floor of the vehicle to exhaust the exhaust gas to the rear of the vehicle, and the arrangement of the exhaust pipe 12 and the connection of the exhaust pipe 12 to the exhaust side of the engine 10 is obvious to a person skilled in the art, so a detailed description thereof is omitted.

The exhaust gas exhausted from the engine 10 passes through the exhaust pipe 12 via the exhaust gas purification system 20. The exhaust gas via the exhaust gas purification system 20 sequentially passes through the front catalyst 22 and the rear catalyst 24. In other words, the front end of the housing 21 is connected to the engine 10 by the exhaust pipe 12 to receive the exhaust gas exhausted from the engine 10, and the rear end of the housing 21 communicates with the exhaust pipe 12 to exhaust the exhaust gas via the exhaust gas purification system 20 to the rear of the vehicle. Here, the front and rear of the constituent elements is based on the flow of the exhaust gas, and it is defined that the exhaust gas flows from the front to the rear of the constituent elements.

The front catalyst 22 functions to primarily purify the exhaust gas that is flowing into the housing 21 through the front of the housing 21.

Also, the front catalyst 22 is a palladium catalyst, and oxidizes hydrocarbons (HC) and carbon monoxide (CO) and simultaneously occludes nitrogen oxides (NOx). More specifically, a Pd/CZO catalyst among the palladium (Pd) catalyst may be applied to the front catalyst 22. Here, since the Pd catalyst and CZO, which is a mixed oxide of cerium (Ce) and zirconium (Zr) contained in order to increase the activity efficiency of the Pd catalyst, are obvious to a person of ordinary skill in the art, a detailed description thereof is omitted.

The rear catalyst 24 is disposed at the rear of the front catalyst 22, and functions to secondarily purify the exhaust gas having passed the front catalyst 22 before being discharged to the rear end of the housing 21. In addition, the rear catalyst 24 is a rhodium catalyst, which reduces nitrogen oxides (NOx). More specifically, a Rh/CZO catalyst among the rhodium (Rh) catalyst may be applied to the rear catalyst 24. The Rh catalyst is obvious to a person of ordinary skill in the art, so a detailed description thereof will be omitted.

The exhaust gas purification system 20 further includes a controller 25.

The controller 25 is connected to the air flowmeter 34 to receive a signal corresponding to the flow rate of the air flowing through the intake pipe 33 and is connected to the temperature sensor 35 to receive a signal corresponding to the temperature of the exhaust gas flowing in the exhaust pipe 12 connected to the front of the housing 21. The controller 25 is connected to the injector 32 to control the concentration of the non-combusted fuel contained in the exhaust gas. That is, the controller 25 functions to regulate the fuel concentration of the exhaust gas according to the temperature of the exhaust gas flowing into the housing 21. Here, for collecting the temperature of the exhaust gas and information of an air/fuel ratio by the controller 25, the temperature sensor 35 and an oxygen sensor (not shown) connected to the controller 25 are typically used, however it is not limited thereto. In addition, the controller 25 performs a normal control, a rich control, and a lean control according to the temperature of the exhaust gas flowing into the housing 21.

The normal control of the controller 25 refers to controlling the concentration of the non-combusted fuel contained in the exhaust gas flowing into the housing 21 so that the lean fuel and the rich fuel are periodically repeated with the regular interval. The normal control is performed when the temperature of the exhaust gas flowing into the housing 21 is above a predetermined temperature (T).

The rich control of the controller 25 refers to controlling the concentration of the non-combusted fuel contained in the exhaust gas flowing into the housing 21 to become the rich fuel. This rich control is selectively performed when the temperature of the exhaust gas flowing into the housing 21 is below the set temperature (T). Here, the predetermined temperature (T) is a temperature at which the cold state of the engine 10 is determined, and the controller 25 determines that the engine 10 is in a cold state at the initial stage of the engine startup if the temperature of the exhaust gas flowing into the housing 21 is less than the predetermined temperature (T).

The lean control of the controller 25 refers to controlling the concentration of the non-combusted fuel contained in the exhaust gas flowing into the housing 21 to be a lean fuel. This lean control is selectively performed when the temperature of the exhaust gas flowing into the housing 21 is less than the predetermined temperature (T). Here, the lean control may be continuously performed after the rich control is temporarily executed in the cold state of the initial stage of the engine 10 startup. Also, the rich control may be performed temporarily while the engine 10 is starting, then the lean control may be performed while the cold state of the initial stage of the engine 10 starting is maintained, and the normal control may be performed when the engine 10 is out of the cold state of the initial starting.

Further, the reference of the lean fuel and the rich fuel, the method of adjusting the air/fuel ratio so that the concentration of the non-combusted fuel contained in the exhaust gas flowing into the housing 21 is controlled as the lean fuel or the rich fuel, and the predetermined temperature (T) determining the cold state of the engine 10 may be selected according to a design of the engine and auxiliary components, and are obvious to a person of ordinary skill in the art.

Figure 2:
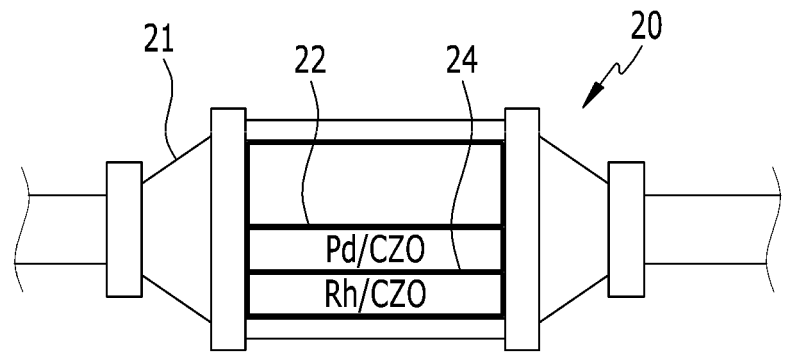
FIG. 2 is a schematic diagram of a variation of an exhaust gas purification system of a vehicle according to another form of the present disclosure.
Figure 2:
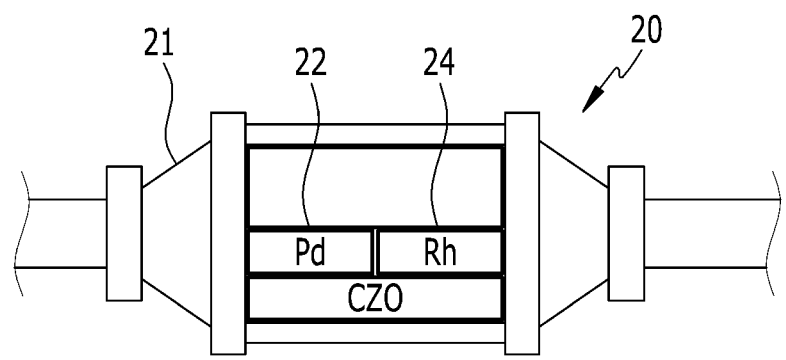
Figure 2:
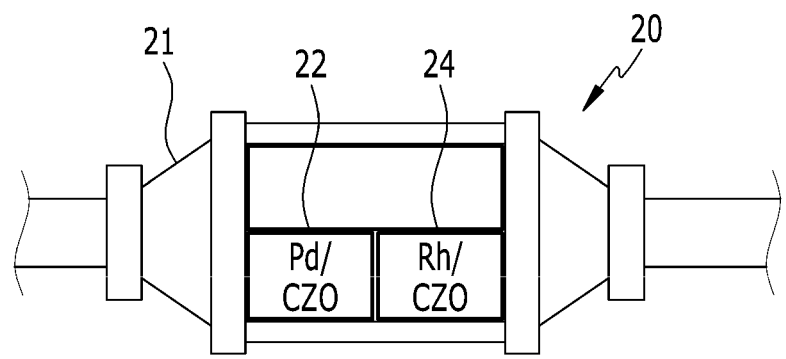

FIG. 2 is a schematic diagram of a variation of an exhaust gas purification system of a vehicle according to another aspect of the present disclosure.

As shown in FIG. 2 (a), the front catalyst 22 to which the Pd/CZO catalyst is applied among the palladium (Pd) catalyst and the rear catalyst 24 to which the Rh/CZO catalyst is applied among the rhodium (Rh) catalyst may be coated to be overlapped on a carrier (not shown). In this case, as the front catalyst 22 is coated on the relative outer side with which the exhaust gas is in direct contact and the rear catalyst 24 is coated on the relative inner side close to the carrier, the function that the front catalyst 22 oxidizes hydrocarbons (HC) and carbon monoxide (CO) and simultaneously occludes nitrogen oxides (NOx) and the function that the rear catalyst 24 reduces the occluded nitrogen oxides (NOx), may be secured.

As shown in FIG. 2 (b), the front catalyst 22 and the rear catalyst 24 may be provided so that the palladium (Pd) may be coated on the relative front to configure the front catalyst 22 and the rhodium (Rh) may be coated on the relative rear to configure the rear catalyst 24 on the CZO coated on the substrate. Thereby, the function that the front catalyst 22 oxidizes hydrocarbons (HC) and carbon monoxide (CO) and simultaneously occludes nitrogen oxides (NOx), and the function that the rear catalyst 24 reduces nitrogen oxides (NOx), are secured.

As shown in FIG. 2 (c), the front catalyst 22 to which the Pd/CZO catalyst among the palladium (Pd) catalyst is applied and the rear catalyst 24 to which the Rh/CZO catalyst among the rhodium (Rh) catalyst is applied may be sequentially coated on the carrier. That is, the Pd/CZO catalyst may be coated on the relative front on the carrier and the Rh/CZO catalyst may be coated on the relative rear on the carrier. Thereby, the function that the front catalyst 22 oxidizes hydrocarbons (HC) and carbon monoxide (CO) and simultaneously occludes nitrogen oxides (NOx), and the function that the rear catalyst 24 reduces nitrogen oxides (NOx) are secured.

The configuration according to the modified forms of the front catalyst 22 and the rear catalyst 24, which are coated to be overlapped or sequentially arranged on the carrier, may be selectively implemented according to the intention of a person of ordinary skill in the art.

Figure 3:
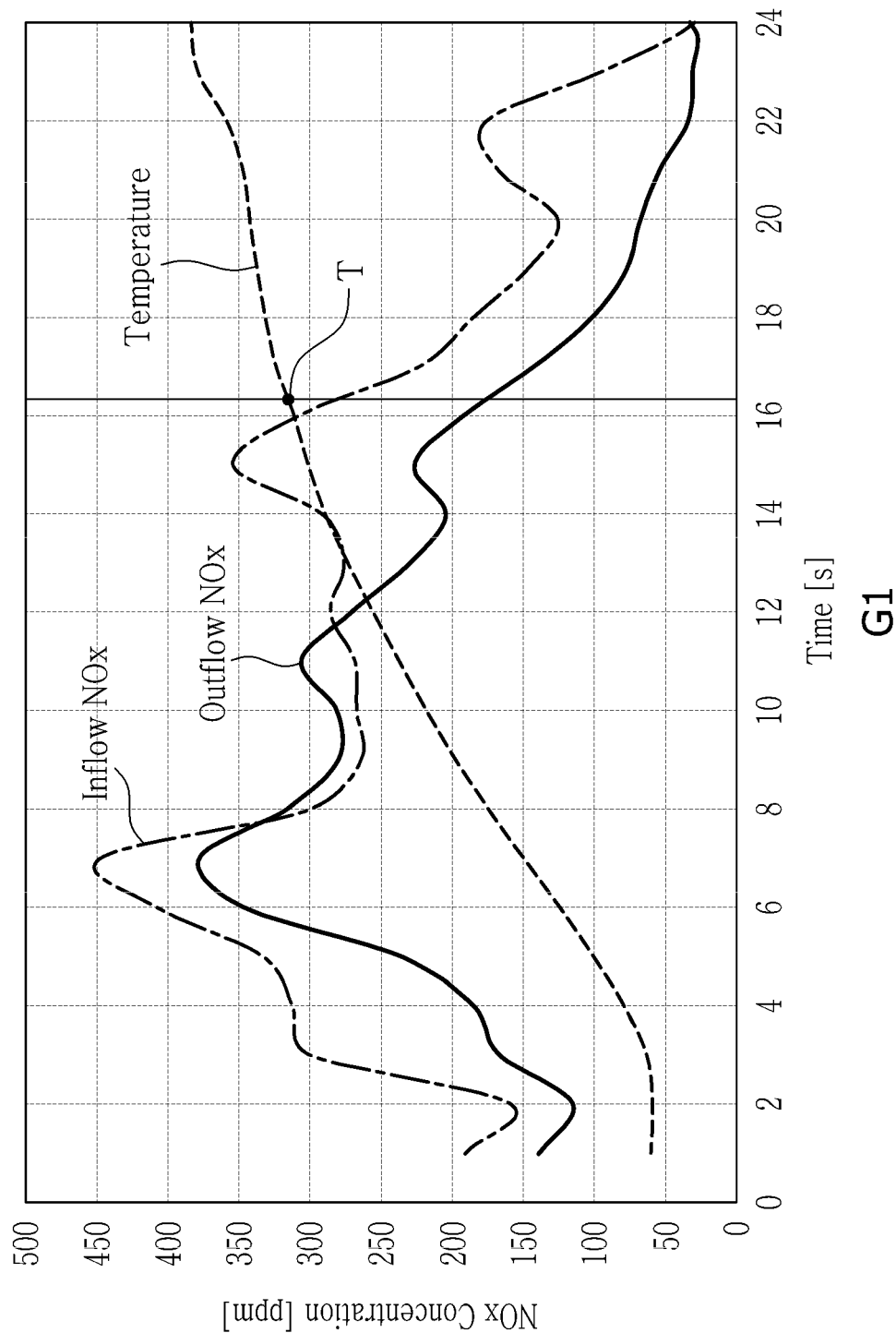
FIG. 3 is a graph showing performance of storing nitrogen oxides when an exhaust gas purification system of a vehicle according to one form of the present disclosure is operated without a temporary rich control in a cold state of an engine.

FIG. 3 is a graph showing performance of storing nitrogen oxides when an exhaust gas purification system of a vehicle according to an aspect of the present disclosure is operated without a temporary rich control in a cold state of an engine.

In a graph G1 shown in FIG. 3, a vertical axis represents the concentration of nitrogen oxides (NOx) included in the exhaust gas and a horizontal axis represents time. That is, the graph G1 shows the concentration of nitrogen oxides (NOx) included in the exhaust gas according to time in the initial cold state after starting the engine 10. On the other hand, in the graph G1, an increasing curve of the temperature of the exhaust gas according to the time in the initial cold state after the starting of the engine 10 is shown by a dotted line, the change in the concentration (Inflow NOx) of nitrogen oxides (NOx) contained in the exhaust gas flowing into the housing 21 is shown by a one-dot chain line, and the change in the concentration (Outflow NOx) of nitrogen oxides (NOx) contained in the exhaust gas flowing out of the housing 21 is shown by a solid line.

The change in the outflow NOx shown in the graph G1 is experimentally determined separate from the actual control of the exhaust gas purification system 20 of the vehicle according to one aspect of the present disclosure, and shows the change of the Outflow NOx according to the nitrogen oxides (NOx) occluding by the front catalyst 22, particularly, in the case that a precondition for performing the occluding of the nitrogen oxides (NOx) through the front catalyst 22 in the initial cold state after the starting of the engine 10 is the lean fuel condition under the normal control for controlling the concentration of the non-combusted fuel included in the exhaust gas flowing into the housing 21, so that the lean fuel and the rich fuel are periodically repeated at regular intervals. That is, the graph G1 is for helping to understand that the concentration (Outflow NOx) of nitrogen oxides (NOx) included in the exhaust gas flowing out from the housing 21 is remarkably different in the case that the precondition is the lean fuel condition compared with the case that the precondition for performing the occluding of nitrogen oxides (NOx) by the front catalyst 22 is temporarily made into the rich fuel condition through the rich control controlling the concentration of the non-combusted fuel included in the exhaust gas flowing into the housing 21 to be the rich fuel.

Figure 4:
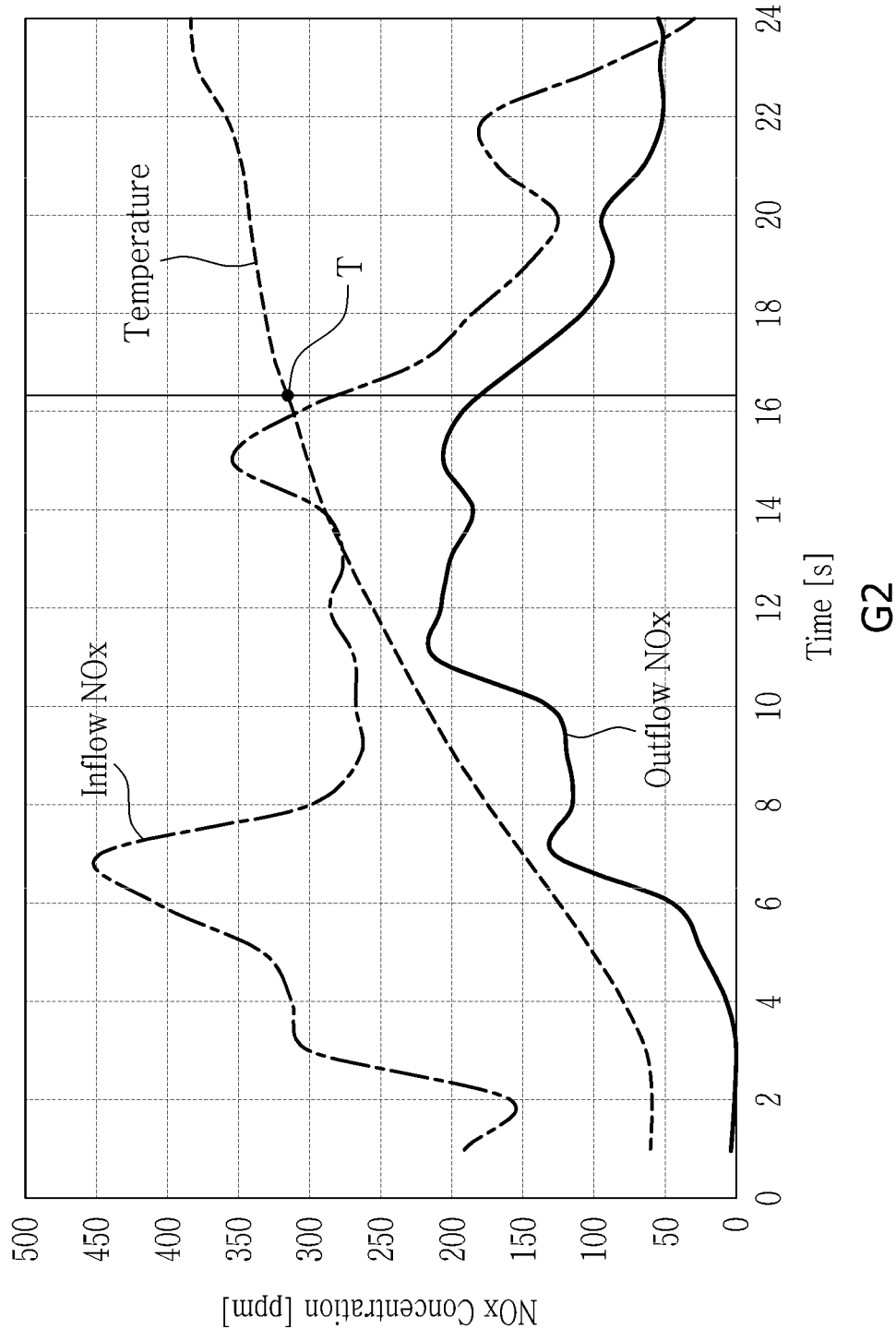
FIG. 4 is a graph showing a performance of storing nitrogen oxides when an exhaust gas purification system of a vehicle according to one form of the present disclosure is operated through a temporary rich control in a cold state of an engine.

FIG. 4 is a graph showing performance of storing nitrogen oxides when an exhaust gas purification system of a vehicle according to an aspect of the present disclosure is operated through a temporary rich control in a cold state of an engine.

The graph G2 shown in FIG. 4 excludes the change of the Outflow NOx in the case that the precondition for performing the occluding of the nitrogen oxides (NOx) by the front catalyst 22 is the lean fuel condition in the graph G1 shown in FIG. 3, and shows the change of the Outflow NOx in the case that the precondition for performing the occluding of the nitrogen oxides (NOx) by the front catalyst 22 is made into the rich fuel condition through the rich control for controlling the concentration of the non-combusted fuel included in the exhaust gas flowing into the housing 21 to be the rich fuel. In other words, in the graph G2 shown in FIG. 4, the increasing curve of the temperature increase and the change of the Inflow NOx are the same as shown in FIG. 3, and the change of the Outflow NOx is different from in the graph G1 shown in FIG. 3. On the other hand, in the graph G2, the increasing curve of the temperature increase according to the time passage in the initial cold state after the starting of the engine 10 is shown by a dotted line, the change in the concentration (Inflow NOx) of nitrogen oxides (NOx) contained in the exhaust gas flowing into the housing 21 is shown by a one-dot chain line, and the change of the concentration (Outflow NOx) of nitrogen oxides (NOx) included in the exhaust gas flowed out from the housing 21 is shown by a solid line. As shown in the Outflow NOx change in FIG. 3 and FIG. 4, in the initial cold state of the starting of the engine 10, if the precondition for performing the occluding of nitrogen oxides (NOx) by the front catalyst 22 is controlled to be the rich fuel so that the exhaust gas flowing into the housing 21 temporarily becomes the rich fuel, the concentration (Outflow NOx) of nitrogen oxides (NOx) included in the exhaust gas having flowed out from the housing 21 is remarkably reduced compared with the case that the precondition is the lean fuel. That is, a storing amount of nitrogen oxides (NOx) occluding nitrogen oxides (NOx) in the front catalyst 22 is greatly increased.

In this way, in the rich control of the precondition for improving the occluding performance of nitrogen oxides (NOx) of the front catalyst 22, properties of the front catalyst 22, which the occluding amount of nitrogen oxides (NOx) after the Pd/CZO catalyst is reduced is increased, the occluding amount of nitrogen oxides (NOx) is increased in the state that the palladium (Pd) catalyst is a metal, the NO adsorbed on the Pd is surface-moved (spillover) to the adjacent CZO, and an absorbing force is increased while the NO surface-transferred to the CZO forms nitrites, etc. are used. On the other hand, the rich control of the precondition may be performed for 1 second to 3 seconds at a lambda value of 0.7 to 0.9. It may be desirable for the rich control of the precondition to last for more than 1 second at a peak lambda value of less than 0.9.

Figure 5:
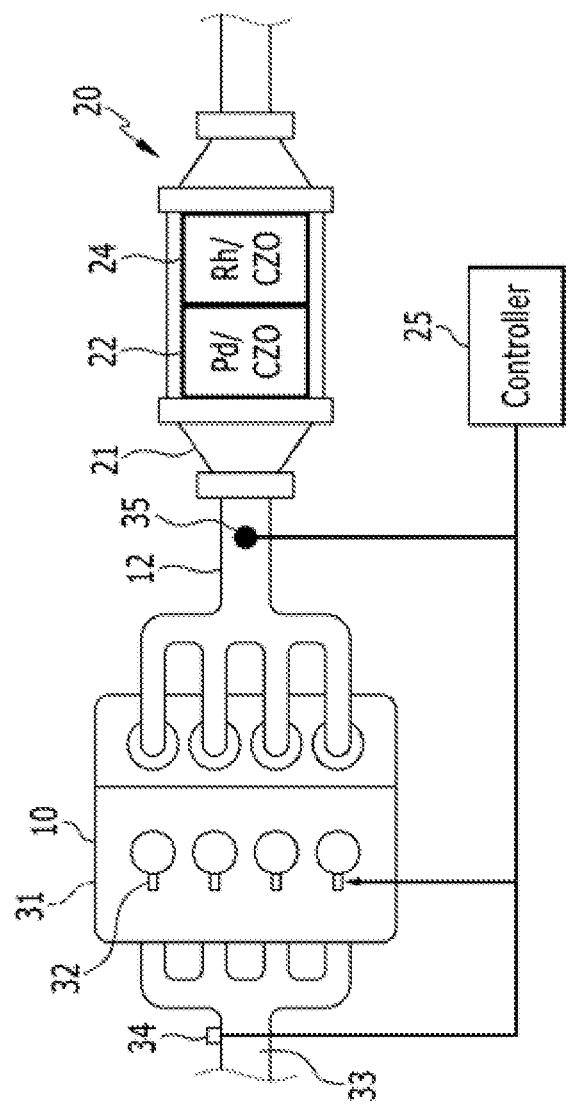
FIG. 5 is a block diagram illustrating a relationship of inputs and outputs for performing a control method of an exhaust gas purification system of a vehicle according to a form of the present disclosure.

FIG. 5 is a block diagram illustrating a relationship of inputs and outputs for performing a control method of an exhaust gas purification system of a vehicle according to a form of the present disclosure.

As shown in FIG. 5, the controller 25 for performing a control method of an exhaust gas purification system of a vehicle according to one form of the present disclosure is connected to the air flowmeter 34 to receive the signal corresponding to the flow rate of the air supplied to the combustion chamber 31, and is connected to the temperature sensor 35 to receive the signal corresponding to the temperature of the exhaust gas flowing into the housing 21. In addition, the controller 25 is connected to the injector 32 to control the concentration of the non-combusted fuel contained in the exhaust gas according to the temperature of the exhaust gas flowing into the housing 21. The concentration of the non-corn busted fuel contained in the exhaust gas, which is not limited to, can be controlled by controlling an amount of the fuel supplied by the injector 32 according to the flow rate of the air supplied into the combustion chamber 31. To this end, the controller 25 may include a memory configured to store program instructions therein and a processor configured to execute the program instructions for performing steps of the method according to one form of the present disclosure.

Figure 6:
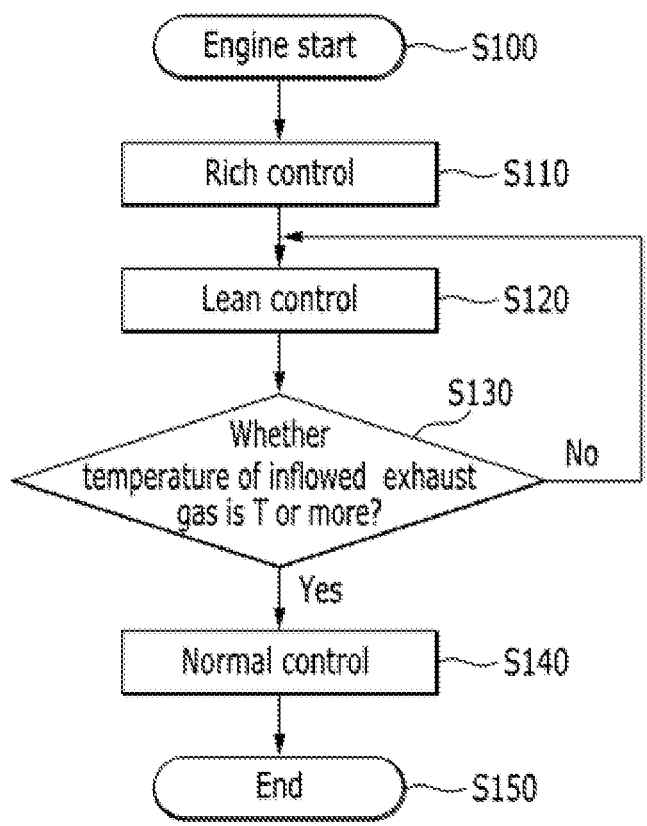
FIG. 6 is a flowchart of a control method of an exhaust gas purification system of a vehicle according to a form of the present disclosure.

FIG. 6 is a flowchart of a control method of an exhaust gas purification system of a vehicle according to one form of the present disclosure.

As shown in FIG. 6, a control method of the exhaust gas purification system of the vehicle according to an aspect of the present disclosure is started along with the starting of the engine 10 (S100). Also, the rich control for controlling the concentration of the non-combusted fuel included in the exhaust gas flowing into the housing 21 to be the rich fuel is performed by the controller 25 along with or directly after the starting of the engine 10 (S110). After temporarily performing the rich control to reduce the front catalyst 22, the lean control for controlling the concentration of the non-combusted fuel included in the exhaust gas flowing into the housing 21 to be the lean fuel is performed by the controller 25 (S120). The lean control may be performed by maintaining the lambda value within 1.02~1.1. The lean control may be preferably maintained until the lowest lambda value is 1.03 or more.

The controller 25 determines whether the temperature of the exhaust gas flowing into the housing 21 is a predetermined temperature (T) or more during the lean control is performed (S130).

If the temperature of the exhaust gas flowing into the housing 21 is less than the predetermined temperature (T), the lean control is continuously performed (S120). That is, the lean control is maintained when it is determined that the engine 10 is in the initial cold state of the starting.

If the temperature of the exhaust gas flowing into the housing 21 is the predetermined temperature (T) or more, the normal control for the concentration of the non-combusted fuel included in the exhaust gas flowing into the housing 21 is performed by the controller 25 so that the lean fuel and the rich fuel are periodically repeated with the regular interval (S140). That is, the normal control is performed while the engine 10 is out of the initial cold state of the starting, and the control method of the exhaust gas purification system of the vehicle according to an aspect of the present disclosure for improving the efficiency of the front catalyst 22 occluding nitrogen oxides (NOx) in the initial cold state of the starting of the engine 10 while performing the normal control is finished (S150). Here, nitrogen oxides (NOx) are occluded to the front catalyst 22 while the lean control is performed by the controller 25 (S120) after the rich control is performed by the controller 25 (S110), nitrogen oxides (NOx) exit the front catalyst 22 and are reduced in the rear catalyst 24 to be removed while the temperature of the exhaust gas flowing into the housing 21 becomes the predetermined temperature (T) or more (S130) such that the normal control is performed by the controller 25 (S140). Referring to FIG. 3 and FIG. 4, the time point at which the nitrogen oxides (NOx) are removed is shown as when the temperature of the exhaust gas flowing into the housing 21 is above the predetermined temperature (T).

As described above, according to one form of the present disclosure, by temporarily performing the rich control for reducing the front catalyst 22 of the three-way catalyst (TWC), the amount of nitrogen oxides (NOx) occluded to the front catalyst 22 in the lean fuel state may be increased. Thus, even in the cold state, which is the initial stage of the engine 10 starting, nitrogen oxides (NOx) in the exhaust gas may be effectively removed.

While this present disclosure has been described in connection with what is presently considered to be practical forms, it is to be understood that the present disclosure is not limited to the disclosed forms, but on the contrary, it is intended to cover various modifications and equivalent arrangements included within the spirit and scope of the present disclosure.

What is claimed is:

1. An exhaust gas purification system of a vehicle provided on an exhaust pipe connected to an exhaust side of an engine for purifying an exhaust gas of the engine, comprising:
    a housing having a front and a rear, the housing configured to receive the exhaust gas exhausted from the engine and disposed on the exhaust pipe to exhaust the exhaust gas downstream of the housing;
    a front catalyst embedded in the housing to primarily purify the exhaust gas flowing into the housing through the front of the housing;
    a rear catalyst embedded in the housing to secondarily purify the exhaust gas passing through the front catalyst before flowing out to the rear of the housing; and
    a controller connected to the exhaust pipe via a temperature sensor at the front of the housing and configured to control a concentration of a non-combusted fuel included in the exhaust gas according to a temperature of the exhaust gas flowing into the housing, wherein the temperature of the exhaust gas flowing into the housing is detected by the temperature sensor disposed at the front of the housing, and
    wherein the controller is configured to temporarily perform a rich control for controlling the concentration of the non-combusted fuel included in the exhaust gas flowing into the housing to be a rich fuel at a lambda value of less than 0.9 for a predetermined time when the temperature of the exhaust gas flowing into the housing is less than a predetermined temperature, and further configured to subsequently perform a lean control for controlling the concentration of the non-combusted fuel included in the exhaust gas flowing into the housing to be a lean fuel at a lambda value of greater than 1.02 after the rich control until the temperature of the exhaust gas flowing into the housing reaches the predetermined temperature.

2. The exhaust gas purification system of the vehicle of claim 1, wherein the front catalyst is a palladium catalyst oxidizing hydrocarbons and carbon monoxide and simultaneously occluding nitrogen oxides.

3. The exhaust gas purification system of the vehicle of claim 2, wherein the front catalyst is a Pd/CZO catalyst.

4. The exhaust gas purification system of the vehicle of claim 1, wherein the rear catalyst is a rhodium catalyst reducing nitrogen oxides.

5. The exhaust gas purification system of the vehicle of claim 4, wherein the rear catalyst is a Rh/CZO catalyst.

6. The exhaust gas purification system of the vehicle of claim 1, wherein
    the controller is configured to perform a normal control for controlling the concentration of the non-combusted fuel contained in the exhaust gas flowing into the housing so that a lean fuel and a rich fuel are periodically repeated with a regular interval when the temperature of the exhaust gas flowing into the housing is greater than or equal to the predetermined temperature.

7. The exhaust gas purification system of the vehicle of claim 1, wherein
the predetermined time is more than 1 second.

8. A control method for controlling an exhaust gas purification system of a vehicle, in which a front catalyst to primarily purify an exhaust gas and a rear catalyst to secondarily purify the exhaust gas passing through the front catalyst are embedded in a housing configured to receive the exhaust gas exhausted from an engine and disposed on an exhaust pipe to exhaust the exhaust gas downstream of the housing and a concentration of a non-combusted fuel contained in the exhaust gas is controlled according to a temperature of the exhaust gas flowing into the housing by a controller, comprising the steps of:

performing, by the controller, a rich control for controlling the concentration of the non-combusted fuel contained in the exhaust gas flowing into the housing to be a rich fuel at a lambda value of less than 0.9 for a predetermined time directly after starting of the engine;

subsequently performing, by the controller, a lean control for controlling the concentration of the non-combusted fuel contained in the exhaust gas flowing into the housing to be a lean fuel at a lambda value of greater than 1.02 after the rich control;

determining, by the controller, whether the temperature of the exhaust gas flowing into the housing is a predetermined temperature or more; and performing, by the controller, a normal control for controlling the concentration of the non-combusted fuel contained in the exhaust gas flowing into the housing so that a lean fuel and a rich fuel are periodically repeated with a regular interval in response to determining that the temperature of the exhaust gas flowing into the housing is equal to or greater than the predetermined temperature.

9. The control method of the exhaust gas purification system of the vehicle of claim 8, wherein
the predetermined time is more than 1 second and the front catalyst is reduced for the predetermined time.

10. The control method of the exhaust gas purification system of the vehicle of claim 8, wherein
whether the temperature of the exhaust gas flowing into the housing is the predetermined temperature or more is continuously determined while the lean control is performed.

11. The control method of the exhaust gas purification system of the vehicle of claim 8, wherein
the control method is finished when performing the normal control.

12. The control method of the exhaust gas purification system of the vehicle of claim 8, wherein
the front catalyst is a palladium catalyst oxidizing hydrocarbons and carbon monoxide and simultaneously occluding nitrogen oxides, the rear catalyst is a rhodium catalyst reducing nitrogen oxides,
the nitrogen oxides are occluded to the front catalyst while the lean control is performed in a state wherein the temperature of the exhaust gas flowing into the housing is less than the predetermined temperature after the rich control is performed, and nitrogen oxides are separated from the front catalyst and reduced in the rear catalyst while the temperature of the exhaust gas flowing into the housing is the predetermined temperature or more such that the normal control is performed.

\* \* \* \* \*